| (12) | United States Patent | (10) Patent No.: | US 8,235,391 B2 |
|---|---|---|---|
| | Hatch et al. | (45) Date of Patent: | Aug. 7, 2012 |

(54) RADIAL SHAFT SEAL ASSEMBLY WITH LUBRICATION RETENTION AND DEBRIS EXCLUSION FEATURE AND METHOD OF CONSTRUCTION THEREOF

(75) Inventors: Frederick R. Hatch, Ann Arbor, MI (US); David M. Toth, Brighton, MI (US)

(73) Assignee: Federal-Mogul Corporation, Southfield, MI (US)

( * ) Notice: Subject to any disclaimer, the term of this patent is extended or adjusted under 35 U.S.C. 154(b) by 350 days.

(21) Appl. No.: 12/725,759

(22) Filed: Mar. 17, 2010

(65) Prior Publication Data

US 2011/0227293 A1 Sep. 22, 2011

(51) Int. Cl.
*F16J 15/02* (2006.01)

(52) U.S. Cl. ......... 277/353; 277/551; 277/562; 277/577

(58) Field of Classification Search .................. 277/353, 277/551, 562, 564, 568, 572, 576–577
See application file for complete search history.

(56) References Cited

U.S. PATENT DOCUMENTS

| 4,208,058 | A | * | 6/1980 | Wanner et al. ................ 277/572 |
|---|---|---|---|---|
| 4,277,072 | A | | 7/1981 | Forch |
| 4,696,479 | A | * | 9/1987 | Karcher ........................ 277/353 |
| 4,822,055 | A | | 4/1989 | Hogan |
| 5,129,744 | A | | 7/1992 | Otto et al. |
| 5,183,269 | A | | 2/1993 | Black et al. |
| 5,201,529 | A | | 4/1993 | Heinzen |
| 5,431,413 | A | | 7/1995 | Hajzler |
| 5,480,161 | A | * | 1/1996 | Borowski ..................... 277/419 |
| 5,501,469 | A | * | 3/1996 | Ducugnon et al. ............ 277/551 |
| 6,186,507 | B1 | | 2/2001 | Oldenburg |
| 6,206,380 | B1 | | 3/2001 | Miyazaki |
| 6,257,587 | B1 | * | 7/2001 | Toth et al. .................... 277/309 |
| 6,315,296 | B1 | | 11/2001 | Oldenburg |
| 6,406,026 | B1 | | 6/2002 | Oldenburg |
| 6,464,228 | B1 | | 10/2002 | Oldenburg |
| 6,485,185 | B1 | | 11/2002 | Conway, Jr. et al. |
| 6,666,459 | B1 | | 12/2003 | Hufnagel |
| 6,692,007 | B2 | | 2/2004 | Oldenburg |
| 6,702,295 | B1 | | 3/2004 | Kapcoe et al. |
| 6,722,657 | B2 | * | 4/2004 | Hood et al. ................... 277/345 |
| 6,726,212 | B2 | | 4/2004 | Oldenburg |
| 6,991,234 | B2 | | 1/2006 | Oldenburg |

(Continued)

FOREIGN PATENT DOCUMENTS

DE 3902058 7/1990

(Continued)

*Primary Examiner* — Vishal Patel

(74) *Attorney, Agent, or Firm* — Robert L. Stearns; Dickinson Wright, PLLC

(57) ABSTRACT

A radial shaft seal assembly includes an outer case having an axially extending cylindrical outer rim and an axially extending cylindrical inner rim spaced radially from one another by an annular pocket. A radially extending first leg connects the outer rim to the inner rim and a second leg extends radially inwardly from the inner rim to a free end. The assembly includes a wear sleeve having an axially extending cylindrical wall with an outer surface providing a running surface and a flange extending radially outwardly from the running surface. A seal lip extends inwardly from the free end of the second leg into sealing abutment with the running surface. A first porous filter is received in the pocket, and a second porous filter extends in substantial abutment with the outer rim and the second leg of the outer case.

19 Claims, 5 Drawing Sheets

U.S. PATENT DOCUMENTS

| | | |
|---|---|---|
| 7,055,828 B2 | 6/2006 | Hatch et al. |
| 7,108,267 B2 | 9/2006 | Oldenburg |
| 7,147,229 B2 * | 12/2006 | Madigan ................. 277/551 |
| 7,159,871 B2 | 1/2007 | Oldenburg |
| 7,419,165 B2 | 9/2008 | Toth et al. |
| 7,464,939 B2 | 12/2008 | Matsui |
| 7,658,386 B2 * | 2/2010 | Oldenburg ............... 277/353 |
| 7,931,278 B2 * | 4/2011 | Krulis et al. ............. 277/563 |
| 2002/0011710 A1 | 1/2002 | Oldenburg |
| 2002/0175473 A1 | 11/2002 | Oldenburg |
| 2006/0012129 A1 | 1/2006 | Oldenburg |
| 2006/0038354 A1 | 2/2006 | Toth |

FOREIGN PATENT DOCUMENTS

| | | |
|---|---|---|
| DE | 102008035315 | 1/2010 |
| WO | 0071912 | 11/2000 |

* cited by examiner

RADIAL SHAFT SEAL ASSEMBLY WITH LUBRICATION RETENTION AND DEBRIS EXCLUSION FEATURE AND METHOD OF CONSTRUCTION THEREOF

BACKGROUND OF THE INVENTION

1. Technical Field

This invention relates generally to shaft seals, and more particularly to shaft seal having lubrication retention and debris exclusion features.

2. Related Art

Seal assemblies are well known for providing a dynamic fluid seal between a housing and a shaft, such as may be used in automotive, machine, heavy equipment, construction, agricultural, and industrial applications, for example. Such seal assemblies commonly comprise a rigid carrier for supporting the seal assembly in a bore of the housing and a wear sleeve to provide a running surface for a seal lip of the seal assembly. The seal assemblies function to contain a lubricant, such as oil, on an "oil side" of the seal assembly and to maintain contaminants or debris on an atmosphere or "air side" of the seal assembly.

Numerous prior seals are known wherein a primary lubricant-retention lip is used in combination with a plurality of debris-excluding features which may take the form of shaft-engaging lips, elastomeric excluders, labyrinth passages, and porous filter elements. However, these prior seals can be improved to inhibit the ingress of debris, which can ultimately degrade the performance of the primary seal lip, and to inhibit the egress of lubrication, which ultimately can lead to lubrication leakage, thereby resulting in unsightly oil puddles, such as on driveways and in garages, for example.

SUMMARY OF THE INVENTION

The present invention provides a seal assembly having a particular combination and configuration of debris excluding and lubrication retaining features that cooperate with one another to protect a primary lubricant-retaining seal lip from "air side" contaminants while inhibiting the egress of lubrication from an "oil side" of the seal assembly for an extended period of time.

In accordance with one aspect of the invention, a radial shaft seal assembly is provided. The shaft seal assembly includes an outer case having an axially extending cylindrical outer rim and an axially extending cylindrical inner rim spaced radially from one another by an annular pocket. A radially extending first leg connects the outer rim to the inner rim and a second leg extends radially inwardly from the inner rim to a free end. The assembly further includes a wear sleeve having an axially extending cylindrical wall with an inner surface configured for fixed mounting to a shaft and an outer surface providing a running surface. A flange extends radially outwardly from the running surface. Further, a seal lip extends radially inwardly from the free end of the second leg of the outer case into sealing abutment with the running surface of the wear sleeve. A first porous filter is received in the annular pocket, and a second porous filter extends in substantial abutment with the outer rim and the second leg of the outer case and with the cylindrical wall of the wear sleeve.

In accordance with another aspect of the invention, a method of constructing a radial shaft seal assembly is provided. The method includes forming an outer case having an axially extending cylindrical outer rim and an axially extending cylindrical inner rim spaced radially inwardly from the outer rim by an annular pocket with a radially extending first leg connecting the outer rim to the inner rim and a second leg extending radially inwardly from the inner rim to a free end. Further, forming a wear sleeve having an axially extending cylindrical wall with an inner surface configured for fixed mounting to a shaft and an outer surface providing a running surface with a flange extending radially outwardly from the running surface. Further yet, fixing a primary seal lip to the case with the seal lip extending radially inwardly from the free end of the second leg and disposing a porous first filter in non-fixed relation into the annular pocket. Then, fixing a porous second filter to the outer rim with the second filter axially confronting the first filter and substantially abutting the cylindrical wall of the wear sleeve.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
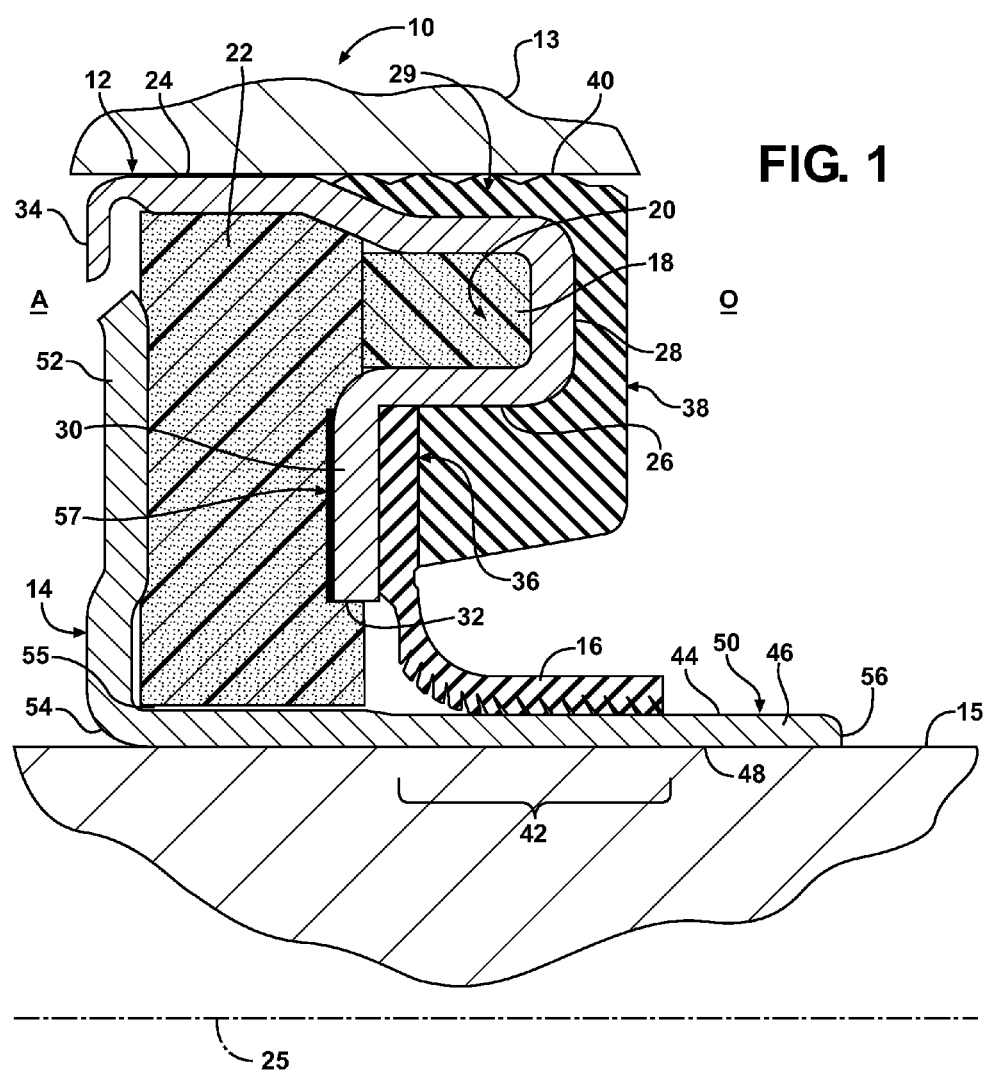
FIG. 1 is an axial cross-sectional view of a radial shaft seal assembly constructed in accordance with one aspect of the invention shown disposed on a shaft.
Figure 1A:
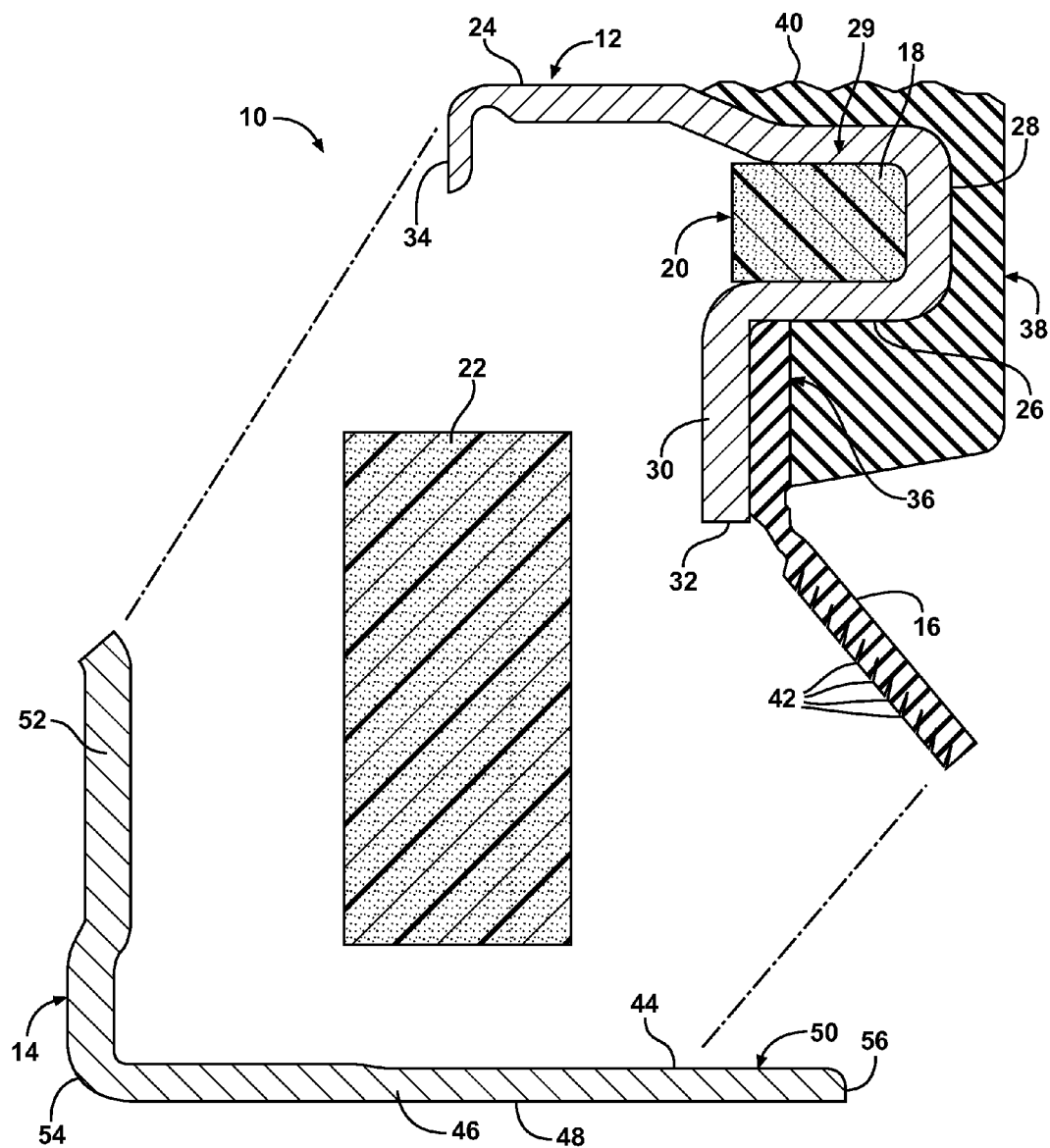
FIG. 1A is a view similar to FIG. 1 with the seal assembly shown removed from the shaft and an inner wear sleeve of the assembly exploded axially from a remaining portion of the assembly.

Referring in more detail to the drawings, FIGS. 1 and 1A illustrate a radial shaft seal assembly 10 constructed in accordance with one aspect of the invention. The seal assembly 10 is well suited for a multitude of applications in which a dynamic fluid seal is required. Such applications may include industrial and automotive applications, such as a crankshaft seal, for example. The seal assembly 10 includes an annular, rigid metal outer case 12 configured for fixed receipt in a housing 13 and an annular wear sleeve 14 configured for fixed receipt on a shaft 15 with a primary seal lip 16 extending radially inwardly from the outer case 12 for sealing engagement with the wear sleeve 14 to inhibit lubricant, i.e. oil, from leaking outwardly from an oil-side O of the seal assembly 10 to an air-side A of the seal assembly 10. Further, the seal assembly 10 includes a porous, annular first filter 18 received in an annular, toroid-shaped pocket 20 of the outer case 12 and a porous, annular second filter 22 captured between the outer case 12 and the wear sleeve 14. The first and second filters 18, 22 cooperate with one another to protect the primary lubricant-retaining seal lip 16 from contaminants on the air-side A while inhibiting the egress of lubrication from the oil-side O of the seal assembly 10. Accordingly, the first and second filters 18, 22 extend the useful life of the seal assembly 10, while also inhibiting oil from leaking from the oil-side O to the air-side A and causing an unsightly mess on a ground surface.

The outer case 12 has an axially extending outermost cylindrical outer wall, also referred to as outer rim 24, extending generally parallel to a central axis 25 and an axially extending cylindrical inner rim 26 spaced radially inwardly in parallel or substantially parallel relation from the outer rim 24 by the annular pocket 20. Thus, the inner rim 26 is configured in underlying relation in radial alignment with at least a portion of the outer rim 24. The outer rim 24 is attached to the inner rim 26 by a radially extending first leg 28 such that the inner rim 26 is inverted in reverse folded relation with the outer rim 24 to form the pocket 20 that is open to the air-side A and closed to the oil-side O. As such, a portion of the outer rim 24, the first leg 28 and the inner rim 26 provide an annular, generally U-shaped projection 29 extending toward the oil-side O of the assembly 10. The inner rim 26 extends axially to a second leg 30 that extends radially inwardly from the inner rim 26 in parallel or substantially parallel relation to the first leg 28 to a free end 32. In addition, the outer case 12 has an annular lip 34 extending radially inwardly from the outer rim 24 such that the lip 34 extends radially inwardly relative to an outermost portion of the second filter 22.

A primary lubricant-retention seal member 36 providing the primary seal lip 16 is attached to the case 12, shown here as being attached to an oil-side of the second leg 30. The seal member 36 in this embodiment is provided as an annular disc or wafer fabricated of polytetrafluoroethylene (PTFE)-based material which may include the usual fillers, etc, although other seal materials, such as elastomers, are contemplated by the invention. The seal member 36 is shown as extending along the full length of the second leg 30 and being fixed thereto by an overmolded rubber material 38. The rubber material 38 is shown as being overmolded about the entire projection 29 such that a radially outermost portion or surface 40 of the rubber material 38 forms at least a portion of the seal assembly outer diameter to facilitate press fitting the outer diameter in fixed and sealed relation within a bore of the housing 13. The seal member 36, as shown in FIG. 1A, extends substantially radially inwardly from the free end 32 of the second leg 30 when in an unbiased, free state separate from the wear sleeve 14. Then, upon assembly of the wear sleeve 14, the seal lip 34 is brought into sealed abutment with the wear sleeve 14. At least the portion of the seal lip 16 abutting the wear sleeve 14 is shown having hydrodynamic features 42 in the preferred form of one or more spiraling grooves or slits which cooperate with the rotating wear sleeve 14 to generate a hydrodynamic pumping action which redirects any lubricant, such as oil, that finds its way beneath the lip 16 from the protected oil-side O of the seal back to the oil-side. As illustrated, the seal lip 16 is bent so as to lay down on a running surface 44 of the wear sleeve 14 axially toward the oil-side O. It should be recognized that the seal member 36 could alternatively be adhered or bonded to the second leg 30 of the case 12 according to known techniques.

The wear sleeve 14 has an axially extending cylindrical wall 46 with an inner surface 48 configured for fixed mounting to the 15 shaft and an outer surface 50 providing the running surface 44 for sealed abutment with the seal lip 16. An annular flange 52 extends radially outwardly from the running surface 44 from an air-side end 54 of the sleeve, while the running surface 44 extends axially to a cylindrical oil-side free end 56. As such, the wear sleeve 14 is generally L-shaped in axial cross-section.

The porous first filter 18 is disposed in the annular pocket 20 of the outer case 12 freely by being set or dropped, in unfixed fashion, therein. Upon being set in the pocket 20, the volume of the pocket is filled, or substantially filled by the filter 18. As such, the first filter 18 is sized in its free state having generally the dimensions as the pocket 20, wherein upon being disposed in the pocket 20, the first filter 18 extends axially between abutting the first leg 28 and being flush with, or substantially flush with an oil-side of the second leg 30. The first filter 18 preferably comprises an open cell sponge, such as one fabricated of a synthetic material, such as polyurethane/polyester foam, by way of example and without limitation. The pores of the first filter 18 allow air to pass freely through the filter 18 while assisting in entrapping and filtering out any debris contained in the air.

Figure 1B:
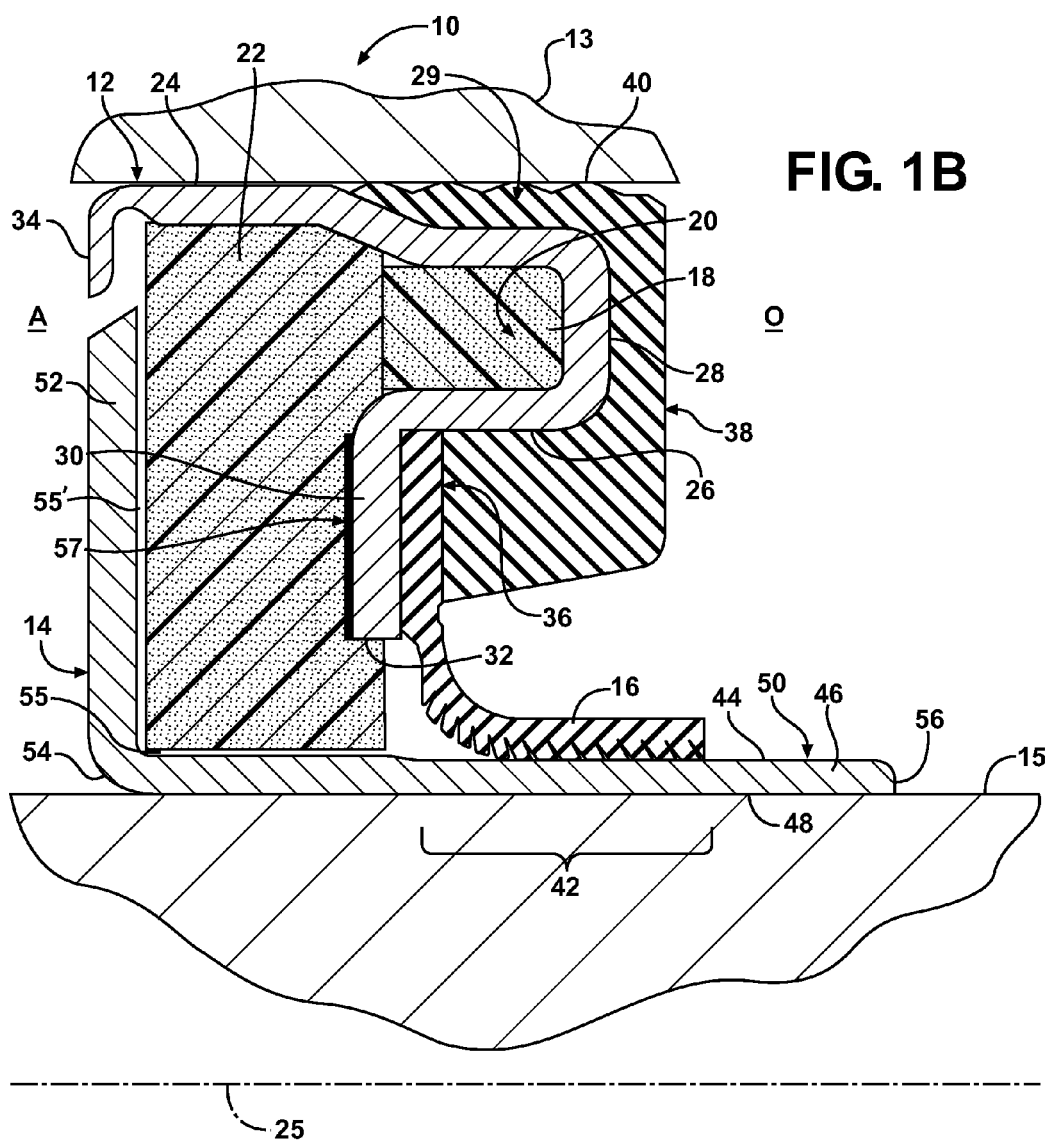
FIG. 1B is a view similar to FIG. 1 of a radial shaft seal assembly constructed in accordance with another aspect of the invention shown disposed on a shaft.

The porous second filter 22, upon assembly of the wear sleeve 14 to the outer case 12, extends radially between abutment with, or substantial abutment with the outer rim 24 and in close proximity, in a slight clearance, with the outer wall 46 of the wear sleeve 14. Accordingly, a small annular gap 55 extends between the second filter 22 and the wear sleeve 14. The gap 55 is preferably minimized to provide a minimal clearance between the second filter 22 and the wear sleeve 14, thereby acting as a barrier to the ingress of contamination, while at the same time minimizing a frictional forces between the second filter 22 and the wear sleeve 14. Further, the second filter 22 extends axially between abutment with the second leg 30 of the outer case 12 and in close proximity with, and shown here, by way of example, as abutting the flange 52 of the wear sleeve 14. The amount of axial compression of the second filter 22 is controlled to produce a minimal amount of dynamic friction between the flange 52 and the second filter 22, which rotate relative to one another in use. Of course, as shown in an alternate embodiment in FIG. 1B, as with the gap 55 provided between the second filter 22 and the cylindrical surface of the wear sleeve 14, a planar gap 55' can be provided to minimize any frictional forces between the second filter 22 and the flange 52 of the wear sleeve 14.

The second filter 22, though constructed as a separate piece of material from the first filter 18, is preferably constructed of a similar material as the first filter 18, and thus, of an open cell sponge, such as one fabricated of a synthetic material, such as polyurethane/polyester foam, by way of example and without limitation. The pores of the second filter 22 allow air to pass freely there through while assisting in entrapping and filtering out any debris contained in the air. To facilitate establishing a barrier to the ingress of debris from the air-side A and a barrier to the egress of lubrication from the oil-side O, the second filter 22 occupies, or otherwise substantially occupies the entire volume within the confines established internally by the outer case 12 and the wear sleeve 14 in combination with the first filter 18, with the exception of the slight clearance 55 between the second filter 22 and the wear sleeve 14, and possibly a slight clearance 55' between the second filter 22 and the flange 52 of the wear sleeve 14. In the embodiment illustrated in FIG. 1, the width of the second filter 22 is slightly greater than the assembled width between the second leg 30 and the flange 52. Thus, the second filter 22 is slightly compressed axially between the second leg 30 and the flange 52. Further, prior to assembly, the second filter 22 is fixed to the outer case 12 to provide relative rotational movement between it and the wear sleeve 14. The second filter 22 is fixed to the outer case 12 by any suitable means, such as by being bonded at a bond joint 57 directly to the oil-side of the second leg 30, for example, and provides a barrier against ingress of debris and egress of lubrication.

Figure 2:
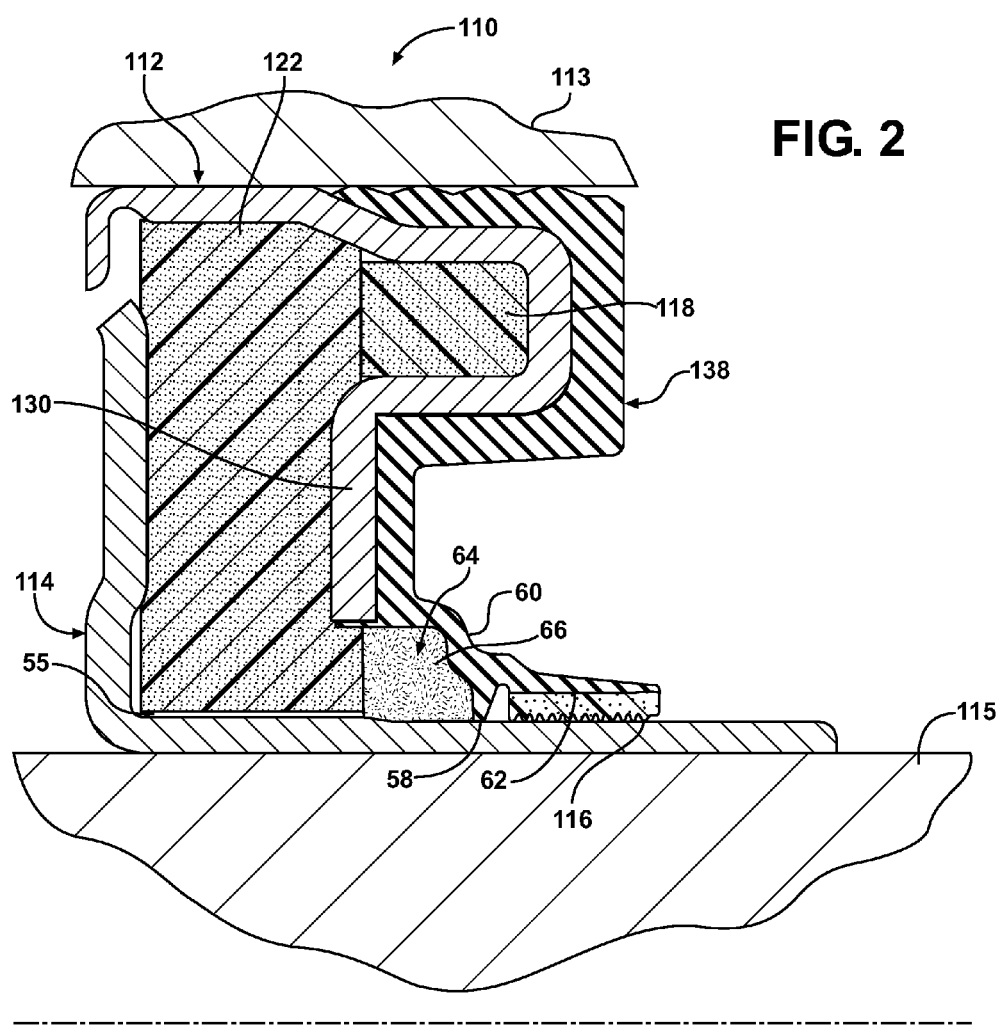
FIG. 2 is an axial cross-sectional view of a radial shaft seal assembly constructed in accordance with another aspect of the invention shown disposed on a shaft.
Figure 2A:
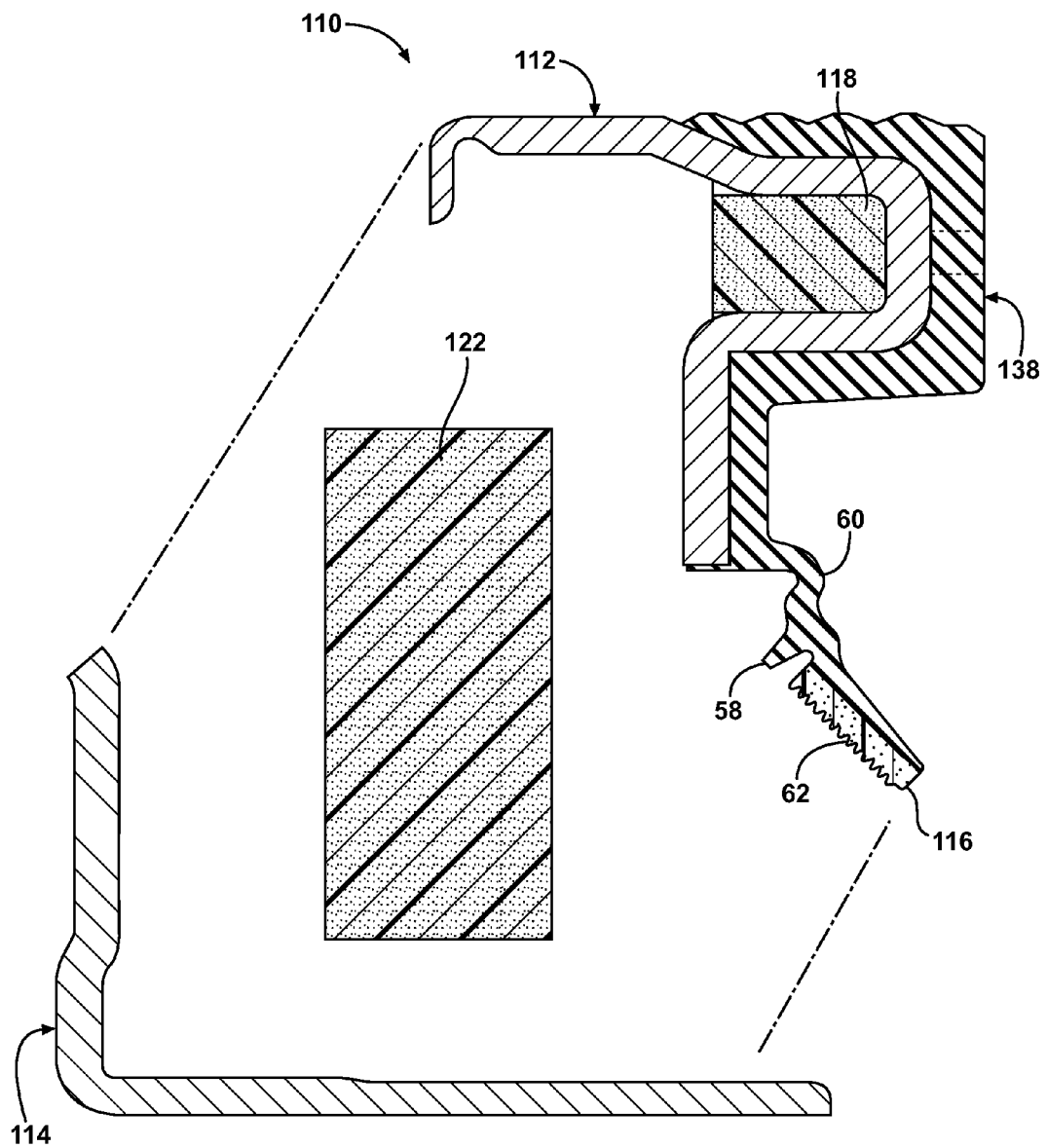
FIG. 2A is a view similar to FIG. 2 with the seal assembly shown removed from the shaft and an inner wear sleeve of the assembly exploded axially from a remaining portion of the assembly.

In FIGS. 2 and 2A, a radial shaft seal assembly 110 constructed in accordance with another aspect of the invention is illustrated, wherein the same reference numerals as used above, offset by a factor of 100, are used to identify similar features. The seal assembly 110 is substantially similar to the previously discussed seal assembly 10, wherein the seal assembly includes an outer case 112 configured for fixed receipt in a housing 113 and a wear sleeve 114 configured for fixed receipt on a shaft 115. The case 112 and wear sleeve 114 are shaped the same as discussed above, and thus, no further detail is believed necessary. Further, the seal assembly 110 includes a first filter 118 and a second filter 122 configured and assembled as discussed above with regard to the first and second filters 18, 22. In addition, the assembly includes a primary seal lip 116, however it also includes a secondary, also referred to as auxiliary seal lip 58. It is with regard to the primary and auxiliary seal lips 116, 58 that the most notable differences occur over the previously discussed assembly 10.

The seal assembly includes an overmolded rubber material 138 as discussed above, however, the overmolded rubber material 138 is bonded directly to an oil-side of the second leg 130 and extends radially inwardly therefrom to provide a necked down or reduced thickness flex hinge region 60 and a planar, or substantially planar seal lip mounting region 62 configured for attachment of the primary seal lip 116 thereto, as shown in FIG. 2A. The primary seal lip 116, as discussed above, can be provided as a PTFE wafer, or other suitable seal elastomeric seal materials. Further, it should be recognized that the rubber material 138 itself could be configured to provided the primary seal lip 116, if desired. In addition, the rubber material 138 forms the auxiliary seal lip 58 on an air-side of the primary seal lip 116, such that the primary seal lip 116 and the auxiliary seal lip 58 are constructed of dissimilar materials. Accordingly, upon assembly, the auxiliary seal lip 58 is positioned axially between the primary seal lip 116 and the second filter 122. Further, an annular void 64 is provided between the second filter 122 and the primary seal lip 116, wherein a grease pack 66 can be incorporated to substantially fill the annular void 64 to further assist in preventing ingress of contamination and egress of lubricant.

Otherwise, the seal assembly 110 is generally the same as discussed above with regard to the assembly 10.

Obviously, many modifications and variations of the present invention are possible in light of the above teachings. It is, therefore, to be understood that within the scope of the appended claims, the invention may be practiced otherwise than as specifically described.

What is claimed is:

1. A radial shaft seal assembly, comprising:
an outer case having an axially extending cylindrical outer rim and an axially extending cylindrical inner rim spaced radially inwardly from said outer rim by an annular pocket with a radially extending first leg connecting said outer rim to said inner rim and a second leg extending radially inwardly from said inner rim to a free end;
a wear sleeve having an axially extending cylindrical wall with an inner surface configured for fixed mounting to a shaft and an outer surface providing a running surface with a flange extending radially outwardly from said running surface;
a primary seal lip extending radially inwardly from said free end of said second leg into sealing abutment with said running surface of said wear sleeve;
a porous first filter received in said annular pocket;
a porous second filter extending in substantial abutment with said outer rim and said second leg of said outer case, and
said first filter abuts said second filter.

2. The radial shaft seal assembly of claim 1 wherein said second filter is fixed to said outer case.

3. The radial shaft seal assembly of claim 2 wherein said second filter is fixed to said second leg.

4. The radial shaft seal assembly of claim 2 wherein said first filter is completely detached from said case.

5. The radial shaft seal assembly of claim 1 wherein an annular void is provided between said second filter and said primary seal lip and further comprising a grease pack substantially filling said annular void.

6. The radial shaft seal assembly of claim 1 wherein an annular void is provided between said second filter and said primary seal lip and further comprising an auxiliary seal lip extending between said primary seal lip and said second filter.

7. The radial shaft seal assembly of claim 1 wherein said outer case has an annular lip extending radially inwardly from said outer rim.

8. The radial shaft seal assembly of claim 7 wherein said annular lip extends radially inwardly relative to a portion of said second filter.

9. The radial shaft seal assembly of claim 1 wherein an annular gap is formed between the second filter and said running surface of said wear sleeve.

10. The radial shaft seal assembly of claim 9 wherein a planar gap is formed between said flange of said wear sleeve and said second filter.

11. The radial shaft seal assembly of claim 1 wherein a planar gap is formed between said flange of said wear sleeve and said second filter.

12. A method of constructing a radial shaft seal assembly, comprising:
forming an outer case having an axially extending cylindrical outer rim and an axially extending cylindrical inner rim spaced radially inwardly from the outer rim by an annular pocket with a radially extending first leg connecting the outer rim to the inner rim and a second leg extending radially inwardly from the inner rim to a free end;
forming a wear sleeve having an axially extending cylindrical wall with an inner surface configured for fixed mounting to a shaft and an outer surface providing a running surface with a flange extending radially outwardly from the running surface;
fixing a primary seal lip to the case with the seal lip extending radially inwardly from the free end of the second leg;
disposing a porous first filter in non-fixed relation into the annular pocket; and
fixing a porous second filter to the outer rim with the second filter axially confronting and contacting the first filter.

13. The method of claim 12 including fixing the second filter to the second leg of the outer case.

14. The method of claim 12 further including axially compressing the second filter between the second leg of the outer case and the flange of the wear sleeve.

15. The method of claim 12 further including filling an annular void between the second filter and the primary seal lip with grease.

16. The method of claim 12 further including providing an auxiliary seal lip between the primary seal lip and the second filter.

17. The method of claim 16 further including forming the primary seal lip and the auxiliary seal lip of dissimilar materials.

18. The method of claim 12 further including providing a planar gap between the flange of the wear sleeve and the second filter.

19. The method of claim 12 further including providing an annular gap between the second filter and a running surface of the wear sleeve.

\* \* \* \* \*